United States Patent [19]

Ross

[11] Patent Number: 5,008,511

[45] Date of Patent: Apr. 16, 1991

[54] PLASMA TORCH WITH AXIAL REACTANT FEED

[75] Inventor: Douglas A. Ross, Richmond, Canada

[73] Assignee: The University of British Columbia, Canada

[21] Appl. No.: 543,403

[22] Filed: Jun. 26, 1990

[51] Int. Cl.$^{5}$ .......... B23K 9/00

[52] U.S. Cl. .......... 219/121.48; 219/121.47; 219/121.5; 219/121.52; 219/75

[58] Field of Search .......... 219/121.48, 121.5, 121.43, 219/121.52, 121.39, 75, 76.16, 76.15; 427/34

[56] References Cited

U.S. PATENT DOCUMENTS

| | | | |
|---|---|---|---|
| 3,578,943 | 5/1971 | Schoumaker | 219/121.5 |
| 3,625,660 | 12/1971 | Reed et al. | 219/121.36 |
| 3,770,935 | 11/1973 | Tateno et al. | 219/121.5 |
| 4,361,441 | 11/1982 | Tylko | 219/121.36 |
| 4,818,837 | 4/1989 | Pfender | 219/121.36 |
| 4,855,563 | 8/1989 | Beresnev et al. | 219/121.48 |

OTHER PUBLICATIONS

Metco Type 3APG Advanced Plasma Gun brochure by Metco a division of Perkin Elmer.

Jet Kote Surfacing System ILA a brochure by Stellite Coatings.

Hypersonic Plasma Jet Coating System a brochure by Plazjet Ltd.

Hypersonic Spray System a brochure by Whitco.

*Primary Examiner*—M.H. Paschall

*Attorney, Agent, or Firm*—C. A. Rowley

[57] ABSTRACT

A plasma torch incorporated at plurality of arc forming chambers arranged symmetrically about an axis and each containing a first electrode. A common electrode cooperates with the electrode in each chamber to form an arc in each chamber and is provided with converging passages leading one from each chamber and converging into a common nozzle passage extending along the axis. A reactant feed passage opens into the common nozzle passage co-axial with the nozzle passage in a region of convergence of the converging passages to inject reactants into the center of the plasma jet formed in the nozzle passage in the direction of movement of the plasma jet through the nozzle passage.

20 Claims, 3 Drawing Sheets

PLASMA TORCH WITH AXIAL REACTANT FEED

FIELD OF THE INVENTION

The present invention relates to a device for forming a plasma jet. More particularly the present invention relates to a device for forming a plasma jet wherein the reactant is fed axially into the plasma jet forming nozzle.

BACKGROUND OF THE PRESENT INVENTION

In traditional plasma spraying a plasma flame is generated using a torch generally water cooled and having a tungsten cathode and a conical copper anode. Reactant which may be liquid, gaseous, solid or mixtures thereof, is entrained into the hot plasma flame by injection radially to the plasma jet. If the reactant is a powder it is generally carried by and driven into the plasma jet by a carrier gas.

The reactant is injected radially into the plasma flame either within the anode channel (nozzle) or a short distance from the nozzle.

With radial injection of powders the heating and dispersion of the injected reactant is strongly dependent on the trajectory of the reactant into the plasma flame jet. For powders these trajectories are determined by particle size, density, injection velocity and morphology and the range of trajectories is dependent on, among other variables, the size distribution of the powders being injection.

Axial injection of reactants has been used in thermal spray torches, see for example the supersonic velocity flame spray torch of Metco Diamond Jet, however, these spray torches are limited to reactants having low melting points (generally below about 1600° C.) and have not been able to spray higher melting point materials.

BRIEF DESCRIPTION OF THE PRESENT INVENTION

It is an object of the present invention to provide an improved plasma jet torch permitting more uniform heat application particularly to particulate reactants.

Broadly the present invention relates to a plasma torch comprising a plurality of arc forming chambers arranged symmetrically about an axis, a first arc forming electrode in each said arc forming chamber, a common electrode cooperating with said first electrode in each said chamber to form an arc in each chamber, plasma passages through said common electrode, said plasma passages converging in a region of convergence into a single plasma nozzle passage extending along said axis and a reactant feed passage opening co-axially into said plasma nozzle passage at said region of convergence thereby to inject reactant substantially axially into said plasma nozzle and the direction of travel of a plasma jet formed in said plasma nozzle passage.

Preferably each said arc forming chamber will be magnetically shielded from other of said arc forming chambers and preferably each said chamber will be insulated to retain heat and to prevent arcing from said first arc forming electrode to an adjacent wall of its chamber i.e. to better ensure arcing is between each said first electrode and said common electrode in each chamber.

Preferably the longitudinal axis of each of the chambers will be substantially parallel to said axis.

Preferably cooling passages will be provided in said torch to cool said chamber and said passages.

Preferably said first electrode will be moveable relative to said common electrode to adjust the arcing distance (arc length) and more preferably each first electrode will be individually adjustable relative to said common electrode.

Means will also preferably be provided to adjust the electrical power applied to the electrodes and will preferably include means to individually adjust the power to each said first electrode.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
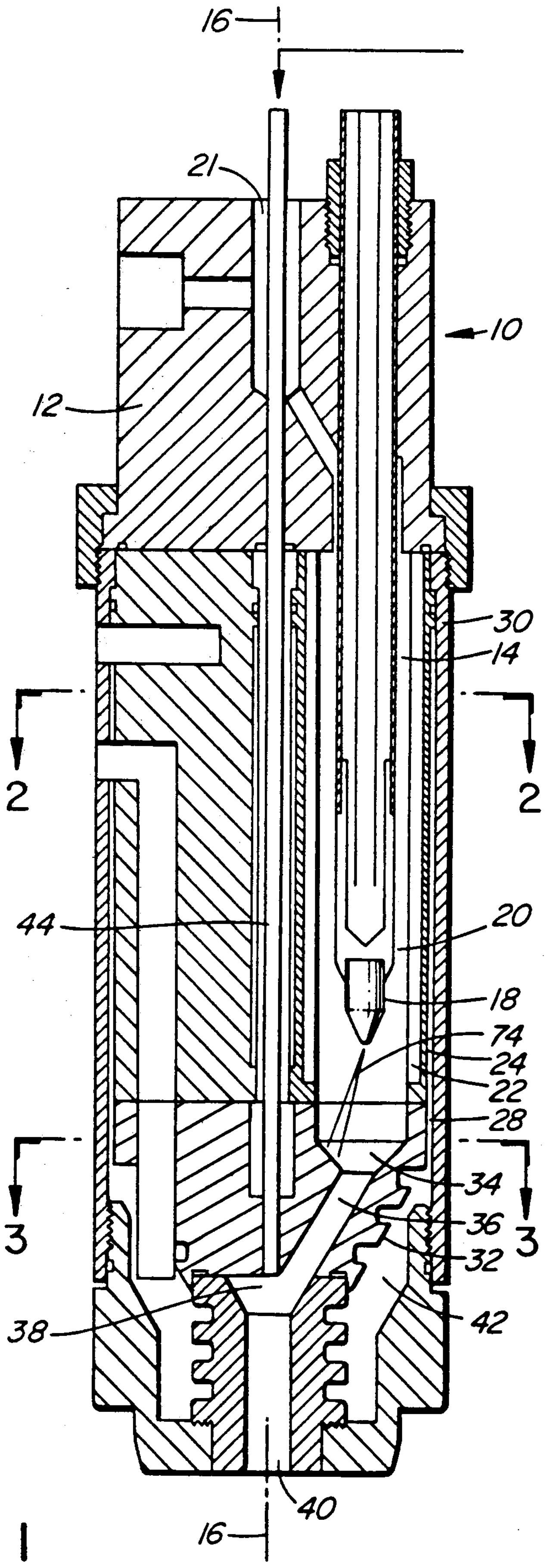
FIG. 1 is a partial section through a torch schematically illustrating one of the arc forming chambers.
Figure 2:
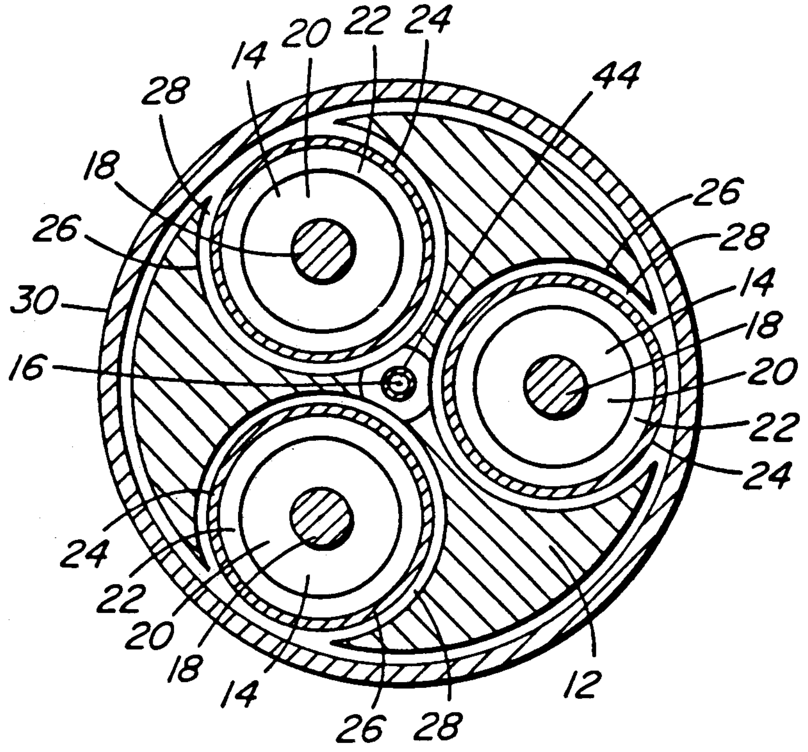
FIG. 2 is a section along the line 2—2 of FIG. 1.
Figure 3:
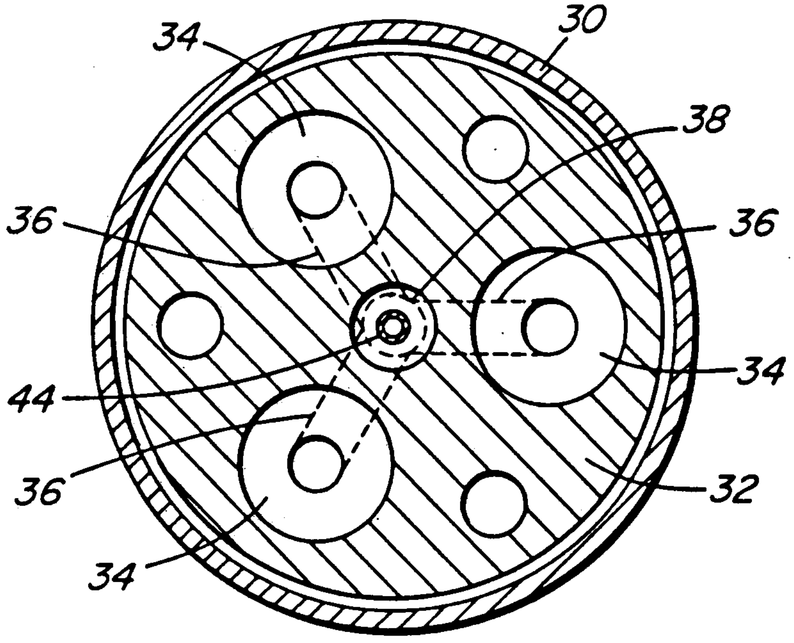
FIG. 3 is a section along the line 3—3 of FIG. 1.

As shown schematically in FIG. 1 the plasma torch 10 has a main body portion 12 formed at least in part by thermal and electrical insulating materials and which includes a plurality of different discrete elements connected together preferably by threaded engagements and incorporating a plurality of cooling passages for circulation of coolant (the precise arrangement of the cooling passages, etc does not form part of this invention and can vary significantly and thus while some have been indicated the precise details of the cooling passages has not been described in detail).

The main elements of the present invention are the arc forming chambers 14 which are symmetrically positioned around the longitudinal axis 16 of the torch 10. There will be a plurality of chambers 14 in any torch preferably three (3), however more chambers may be provided if desired.

Each of the chambers 14 are substantially the same thus only one will be described.

Each of the chambers 14 is provided with a central electrode 18 exiting along the longitudinal axis of the chamber and preferably will combine with the walls of the chamber to define an annular portion of the plasma gas passage 20 connected to the plasma feed inlet 21. The annual portion of the passage 20 surrounding the electrode 18 may be formed as a helical passage so that the plasma gas downstream of the electrode 18 will have a tangential component of velocity and will tend to form a vortex flowing helically along the wall of the chamber 14.

The inner periphery of the chamber 14 is formed by a ceramic insulating liner sleeve 22 to retain heat in the chamber 14 and prevent arcing between the wall of the chamber 14 and the electrode 18. The insulating sleeve 22 is preferably shrunk fit within a cylindrical sleeve 24 which defines the outer surface of the chamber 14. Preferably the outer sleeve 24 will be made of a material that provides a magnetic shield as such a shield will aid in stabilizing the arc struck in each chamber 14.

Each of the arc forming chambers 14 is contained within its respective substantially cylindrical cavity 26 in the body 12 and spaced relative to the walls of the cavity 26 to provide a circumferentially extending annular channel 28 for coolant (cooling water) circulation to cool each of the chambers 14.

The outer surface of the torch 10 surrounding the chambers 14 is formed by a sleeve 30 that helps to connect the various elements of the body 12 of the torch together.

The outlet end of each of the chambers 14 is formed by a common electrode 32 which preferably is a copper anode. This electrode 32 is provided with a separate cavity 34 forming the axial end of each of the chambers 14. Each of the cavities 34 is axially aligned with the axis of its respective chamber 14 and has a cross sectional area corresponding to the area of the cahmber 14, i.e. the cross sectional area of the passage 20 defined by the inner surface of the sleeve 22. A plasma passage 36 leads from each of the cavities 34 preferably at the longitudinal axis of the cavity 34 and converges toward the axis 16 of the torch and intersects with the passages from the other chambers 14 of the plurality of chambers at a region of convergence generally indicated at 38 into a single plasma nozzle passage 40 extending along the axis 16.

The cooling water passages 28 surrounding each of the chambers 14 open into an annular area 42 surrounding the nozzle 40 and the anode 32.

An axial reactant passage 44 is provided through the torch 10 for injection of reactant feed material which may be in the form of a liquid, gas, particulate or solid eg. a wire) into the nozzle 40 and the plasma jet formed therein. This passage 44 opens substantially axially into the passage 40 in the region of convergence (point of intersection) 38 between the plasma passages 36 into the plasma nozzle passage 40 whereby the reactant material is introduced into the plasma jet substantially along the axis of the plasma jet and in the direction of flow of the plasma jet through the nozzle 40.

the cooling water or other cooling fluid passing through the passages 28 surrounding each of the chambers 14 feeds into the areas 42 and 46 to cool the electrode 32 and the outside of the nozzle 40 and is continuously circulated though the torch in known manner.

Figure 4:
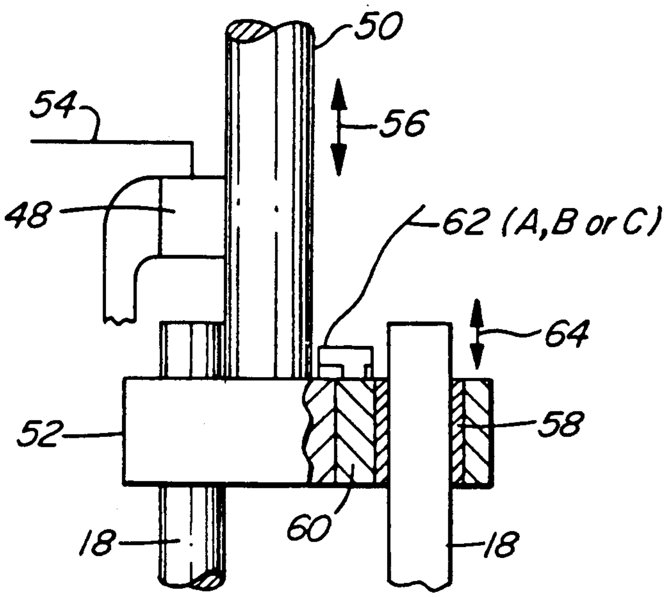
FIG. 4 is a schematic illustration of the adjustment of the first electrode (cathodes) to the body of the torch.

As shown in FIG. 4 it is preferred to be able to axially adjust simultaneously all of the electrodes 18 within their respective chambers 14. This can be done as schematically illustrated in FIG. 4 by a suitable drive mechanism 48 operating on the post 50 connected to the yoke 52 in which each of the electrodes 18 is clamped. The drive 48 may be automatically controlled by signals received via the line 54 to move the three electrodes 18 as indicated by the arrow 56.

Each of the electrodes 18 are mounted to be moved relative the yoke 52. Each is clamped to its respective sleeve 58 the position of which may be axially adjusted relative to the yoke 52 by a suitable drive schematically illustrated at 60. These drives 60 (one for each of thte electrodes 18) are controlled by signals transmitted to the drive via line 62 to move its respective electrode 18 as indicated by the arrow 64.

Figure 5:
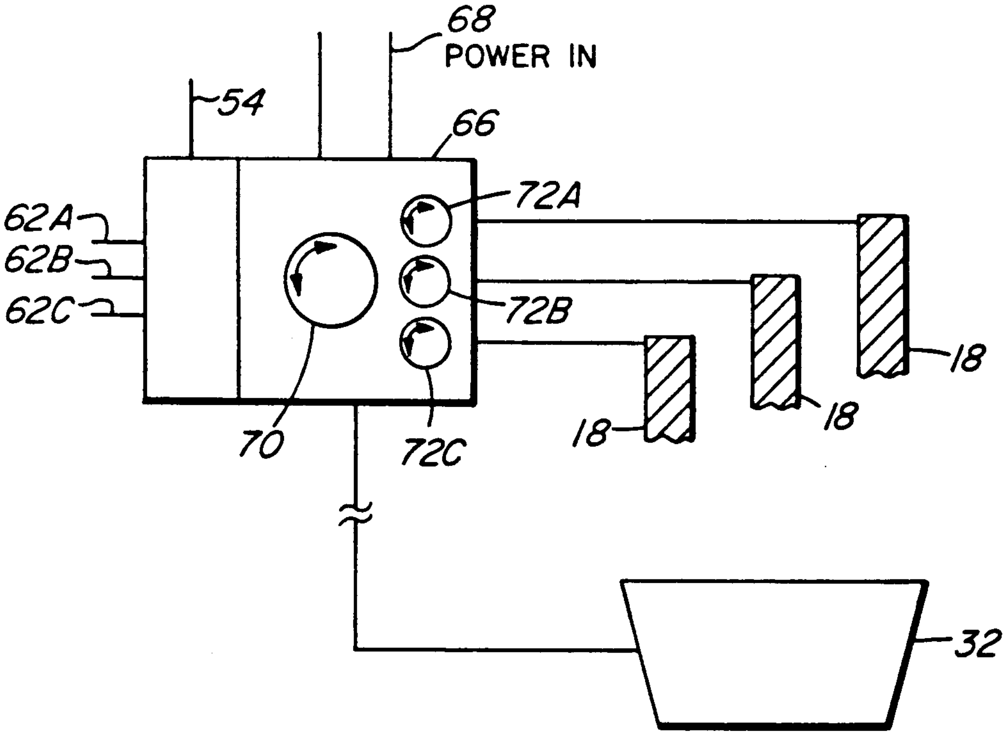
FIG. 5 is a schematic illustration of a control system that may be used with the present invention.

As illustrated in FIG. 5, a controller 66 may be used to control the operation of the system.

The controller 66 has a power input 68, a main control 70 to control the total power to the electrodes 18 and 32 and individual control 72A, 72B and 72C each controlling the power to one of the electrodes 18. If desired a slight difference in power consumption in each of the electrodes may be provided or the power may be balanced to be equal and used accommodate slight differences in the operations of the individual chambers 14.

In operation, at start-up the elctrodes 18 are moved relatively close to the electrode 32 and power is applied while the plasma gas is introduced by a passage 21 to pass through the plasma gas passages 20 and an arc is struck between each cathode 18 which preferably is a tungsten cathode and the common anode 32 which preferably is a copper anode in each of the chambers 14. The cathodes 18 are then moved axially away from the anode 32 to establish the desired length of electric arc as indicated at 74 in FIG. 1 and form the desired plasma exiting through passages 36 into the main passage or jet nozzle 40 to form a plasma jet. Reactant is fed via the passage 44 into the jet 40 to permit the jet to act on the reactant feed. Generally the plasma torch of the present invention will probably be useable, for example, for plasma spraying, powder synthesis, powder spheriodation, rapid solidification, etc.

It will be apparent that optimum operating parameters for achieving quality coating or powders will be empirically determined in the conventional manner for the specific reactant composition being used.

While only 3 chambers 14 have been illustrated, it will be apparent that more chambers may be used as desired. However, they should be concentric with the axis 16 and converge uniform into a single nozzle passage 40 co-axial with the inlet from the reactant feed passage 44. If two chambers 14 only are used to form a torch it may be desirable to specifically shape the cross sections of the plasma passages 36 to facilitate convergence. For example the cross section of the passages 36 may be substantially D-shaped and arranged with the straight portions of the D-shapes in substantially parallel facing relationship or C-shaped and arranged with the ends of the C-shapes in opposed facing relationship.

In the above description all of the chambers 14 of the torch are symmetrically arranged about the axis 16 and have their longitudinal axes substantially parallel to the axis 16. It will be apparent that, if desired, the longitudinal axes of the chambers 14 may be oriented at an acute angle to the axis 16 and approach each other more closely at the electrode 34 eg. with their axes spaced about an imaginary cone formed about the axis 16 and intersecting with the axis 16 downstream from the region 38.

Having described the invention, modifications will be evident to those skilled in the art without department from the spirit of the invention as defined in the appended claims.

What is claimed is:

1. A plasma torch comprising a plurality of arc forming chambers arranged symmetrically about an axis, a first arc forming electrode in each said arc forming chamber, a common electrode cooperating with each of said first electrodes in said chambers to form an arc in each of said chambers a plasma passage through said common electrode opening into each of said chambers, each of said plasma passages leading from its respective of said chamber and converging toward each other in a region of convergence into a single plasma nozzle passage extending along said axis and a reactant feed passage opening axially into an end of said nozzle passage in said region of convergence thereby to inject reactant substantially axially into said plasma nozzle passage and in the direction of travel of a plasma jet formed in said plasma nozzle passage by plasma passing from chambers through said plasma passages into said plasma nozzle passage.

2. A troch as defined in claim 1 further comprising magnetic shielding means encircling each said arc forming chamber.

3. A torch as defined in claim 1 further comprising electrical insulating means for each said chamber tending to prevent arcing from said first arc forming electrode to an adjacent wall of its respective said chamber.

4. A torch as defined in claim 1 wherein each of said chambers has its longitudinal axis substantially parallel to said axis.

5. A torch as defined in claim 2 wherein each of said chambers has its longitudinal axis substantially parallel to said axis.

6. A torch as defined in claim 3 wherein each of said chambers has its longitudinal axis substantially parallel to said axis.

7. A torch as defined in claim 3 further comprising cooling passages in said torch to cool said chambers and said passages.

8. A torch as defined in claim 7 further comprising means to simultaneously move all of said first arc forming electrodes relative to said common electrode.

9. A torch as defined in claim 8 further comprising means to individually adjust each said first arc forming electrode relative to said common electrode.

10. A torch as defined in claim 9 further comprising means to individually adjust the electrical power to each said first arc forming electrode.

11. A torch as defined in claim 1 wherein said plurality is three.

12. A torch as defined in claim 2 wherein said plurality is three.

13. A torch as defined in claim 3 wherein said plurality is three.

14. A torch as defined in claim 4 wherein said plurality is three.

15. A torch as defined in claim 5 wherein said plurality is three.

16. A torch as defined in claim 6 wherein said plurality is three.

17. A torch as defined in claim 7 wherein said plurality is three.

18. A torch as defined in claim 8 wherein said plurality is three.

19. A torch as defined in claim 9 wherein said plurality is three.

20. A torch as defined in claim 10 wherein said plurality is three.

* * * * *

US005008511C1

(12) REEXAMINATION CERTIFICATE (4290th)

United States Patent

Ross

(10) Number: US 5,008,511 C1

(45) Certificate Issued: Mar. 20, 2001

(54) PLASMA TORCH WITH AXIAL REACTANT FEED

(75) Inventor: Douglas A. Ross, Richmond (CA)

(73) Assignee: University of British Columbia, Vancouver (CA)

Reexamination Request:
No. 90/004,979, Apr. 29, 1998

Reexamination Certificate for:

| | |
|---|---|
| Patent No.: | **5,008,511** |
| Issued: | **Apr. 16, 1991** |
| Appl. No.: | **07/543,403** |
| Filed: | **Jun. 26, 1990** |

(51) Int. Cl.[7] .............................. B23K 10/00; B23K 9/00

(52) U.S. Cl. ............................... 219/121.48; 219/121.47; 219/121.5; 219/121.52; 219/75

(58) Field of Search ............................ 219/121.5, 121.52, 219/121.47, 121.51, 74, 75, 121.59, 76.16, 76.15, 121.48, 121.43, 121.39; 427/34

(56) References Cited

U.S. PATENT DOCUMENTS

| | | | | |
|---|---|---|---|---|
| 3,140,380 | | 7/1964 | Jensen . | |
| 3,578,943 | * | 5/1971 | Schoumaker et al. | 219/121.5 |
| 3,625,660 | * | 12/1971 | Reed et al. | 219/121.36 |
| 3,770,935 | * | 11/1973 | Tateno et al. | 219/121.5 |
| 4,361,441 | * | 11/1982 | Tylko | 219/121.36 |
| 4,748,312 | | 5/1988 | Hatch et al. | 219/121 PR |
| 4,780,591 | | 10/1988 | Bernecki et al. | 219/121.52 |
| 4,818,837 | | 4/1989 | Pfender | 219/121.51 |
| 4,855,563 | * | 8/1989 | Beresnev et al. | 219/121.48 |
| 4,882,465 | | 11/1989 | Smith et al. | 219/121.48 |
| 4,902,871 | | 2/1990 | Sanders et al. | 219/121.49 |
| 4,982,067 | | 1/1991 | Marantz et al. | 219/121.47 |
| 5,144,110 | | 9/1992 | Marantz et al. | 219/121.48 |

* cited by examiner

*Primary Examiner*—Mark Paschall

(57) ABSTRACT

A plasma torch incorporated at plurality of arc forming chambers arranged symmetrically about an axis and each containing a first electrode. A common electrode cooperates with the electrode in each chamber to form an arc in each chamber and is provided with converging passages leading one from each chamber and converging into a common nozzle passage extending along the axis. A reactant feed passage opens into the common nozzle passage co-axial with the nozzle passage in a region of convergence of the converging passages to inject reactants into the center of the plasma jet formed in the nozzle passage in the direction of movement of the plasma jet through the nozzle passage.

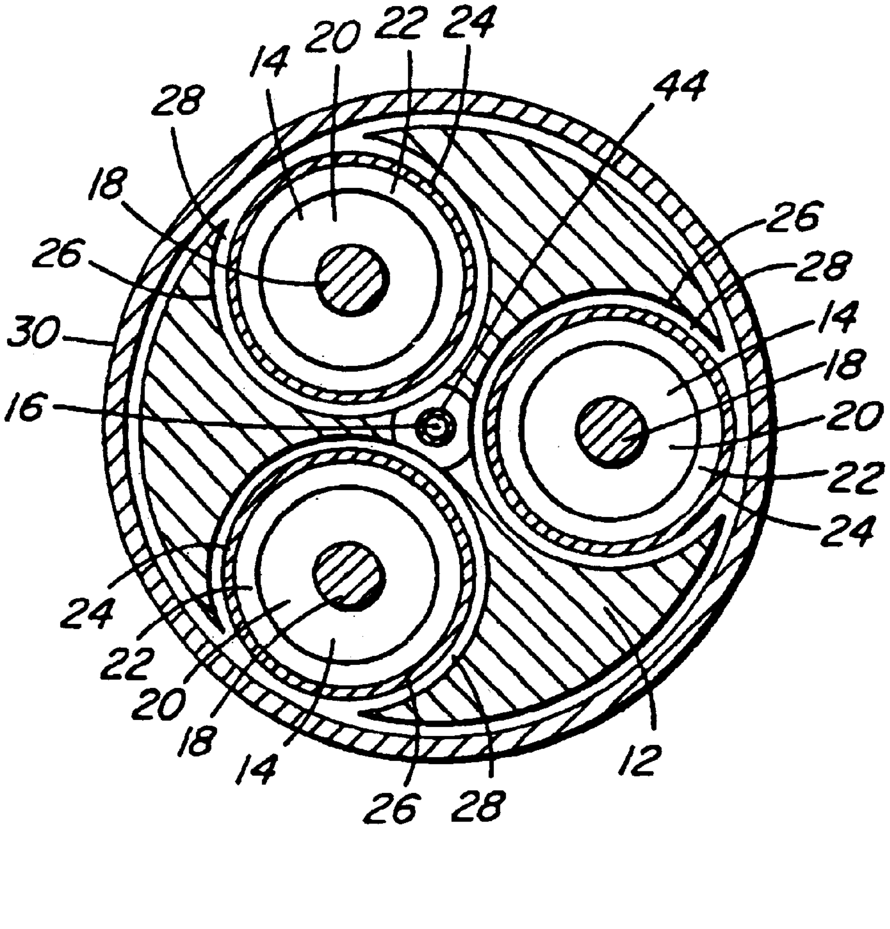

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

Claims 3–20, dependent on an amended claim, are determined to be patentable.

New claims 21–23 are added and determined to be patentable.

1. A plasma torch comprising a plurality of arc forming chambers arranged symmetrically about an axis, a first arc forming electrode in each said arc forming chamber, [a] *an electrically* common electrode cooperating with each of said first electrodes in said chambers to form an arc in each of said chambers, a plasma passage through said common electrode opening into each of said chambers, each of said plasma passages leading from its respective *one* of said [chamber] *chambers* and converging [toward] *into* each other in a region of convergence *downstream of said common electrode* into a single plasma nozzle passage extending along said axis, and a reactant feed passage opening axially into an end of said nozzle passage in said region of convergence thereby to inject reactant substantially axially into said plasma nozzle passage [and] in the direction of travel of a plasma jet formed in said plasma nozzle passage by plasma passing from *said* chambers through said plasma passages into said plasma nozzle passage*, whereby during steady state operation each said arc attaches to said common electrode upstream of said opening of said reactant feed passage*.

2. A [troch] *torch* as defined in claim 1 further comprising magnetic shielding means encircling each said arc forming chamber.

*21. A torch as defined in claim 1 wherein each said arc is retained within each said arc forming chamber.*

*22. A plasma torch comprising a plurality of arc forming chambers arranged symmetrically about an axis, a cathode in each said arc forming chamber and an electrically common anode cooperating with each of said cathodes in said chambers to form an arc in each of said chambers, a plasma passage through said common anode opening into each of said chambers, each of said plasma passages leading from its respective one of said chambers and converging into a region of convergence downstream of said common anode into a single plasma nozzle passage extending along said axis, and a reactant feed passage opening axially into an end of said nozzle passage in said region of convergence thereby to inject reactant substantially axially into said plasma nozzle passage in the direction of travel of a plasma jet formed in said plasma nozzle passage by plasma passing from said chambers through said plasma passages into said plasma nozzle passage, whereby during steady state operation each said arc attaches to said common anode upstream of said opening of said reactant feed passage.*

*23. A torch as defined in claim 22 wherein each said arc is retained within each said arc forming chamber.*

* * * * *